United States Patent
Mohanty et al.

(10) Patent No.: US 8,094,633 B2
(45) Date of Patent: Jan. 10, 2012

(54) ADAPTIVE PAGING AREA

(75) Inventors: Shantidev Mohanty, Santa Clara, CA (US); Muthaiah Venkatachalam, Beaverton, OR (US)

(73) Assignee: Intel Corporation, Santa Clara, CA (US)

(*) Notice: Subject to any disclaimer, the term of this patent is extended or adjusted under 35 U.S.C. 154(b) by 742 days.

(21) Appl. No.: 12/165,280

(22) Filed: Jun. 30, 2008

(65) Prior Publication Data
US 2009/0003285 A1    Jan. 1, 2009

Related U.S. Application Data

(60) Provisional application No. 60/947,383, filed on Jun. 29, 2007, provisional application No. 60/947,375, filed on Jun. 29, 2007.

(51) Int. Cl.
*H04W 4/00* (2009.01)
*H04W 68/00* (2009.01)

(52) U.S. Cl. ........................ 370/338; 455/458

(58) Field of Classification Search .................. None
See application file for complete search history.

(56) References Cited

U.S. PATENT DOCUMENTS

| | | | |
|---|---|---|---|
| 7,751,835 B2 * | 7/2010 | Sharma et al. | 455/458 |
| 2002/0187793 A1 * | 12/2002 | Papadimitriou et al. | 455/458 |
| 2004/0136351 A1 * | 7/2004 | Omae et al. | 370/338 |
| 2005/0250474 A1 * | 11/2005 | Hong et al. | 455/411 |
| 2006/0286982 A1 * | 12/2006 | Prakash et al. | 455/435.1 |
| 2007/0055778 A1 * | 3/2007 | Park et al. | 709/226 |
| 2007/0086395 A1 * | 4/2007 | Bakshi et al. | 370/338 |
| 2007/0087767 A1 * | 4/2007 | Pareek et al. | 455/502 |
| 2007/0104156 A1 * | 5/2007 | Inoue et al. | 370/338 |
| 2007/0105600 A1 * | 5/2007 | Mohanty et al. | 455/574 |

* cited by examiner

*Primary Examiner* — Anh-Vu Ly
(74) *Attorney, Agent, or Firm* — Blakey, Sokoloff, Taylor & Zafman LLP (57) ABSTRACT

Techniques for determining a paging area of a paging group in a wireless communications network based on a value of one or more dynamically changing communication characteristics. In various embodiments, a paging area may be determined to reduce resource use in a wireless communication network supporting an idle mode of a mobile station. In one embodiment, the paging area may be determined based on a speed of a mobile station.

15 Claims, 5 Drawing Sheets

ADAPTIVE PAGING AREA

RELATED APPLICATIONS

This application claims priority from Provisional Application Ser. No. 60/947,383, filed Jun. 29, 2007, entitled "Adaptive Paging Area", the teaching of which is incorporated herein by reference. Applicants hereby cross-reference Non Provisional Patent Application Ser. No. 12/165,438 filed Jun. 30, 2008 entitled "ADAPTIVE SLEEP AREA" which claims priority to Provisional Application Ser. No. 60/947,375, filed Jun. 29, 2007, entitled "ADAPTIVE SLEEP AREA".

BACKGROUND OF THE INVENTION

1. Field of the Invention

The invention relates generally to communications in a wireless network. More particularly, various embodiments pertain to determining the size of a paging area in a wireless network supporting broadband wireless communications.

2. Background Art

Various broadband wireless communications standards such as WiMAX (e.g. the Institute of Electrical and Electronics Engineers (IEEE) 802.16e-2005 standard, released Feb. 28, 2006) incorporate the concept of a "paging group" (PG). In a wireless network supporting such a standard, a base station (BS) servicing a particular geographic area may belong to a paging group of one or more BSs, where the respective geographic areas of the one or more BSs define a "paging area" of the paging group. During an active call session, a mobile station (MS) serviced by the wireless network may be registered with a particular BS of the geographic region in which the MS operates.

In the absence of an active call session, the MS may switch to operating in an idle mode to conserve battery power. In idle mode, the MS may relinquish all of its connections and states associated with the base station (BS) with which it was last registered. While operating in idle mode, an MS alternates between a period of listening for paging messages, known as "paging listen interval" (PLI), and a period during which MS powers off its radio interface, known as "paging unavailable interval" (PUI).

The paging group in which an idle MS resides may be administered by a paging controller (PC). The wireless network may only maintain the current PG of an idle mode MS. When an MS enters an idle mode, a PC, referred to as anchor PC, may create an entry in its database noting the PG where the MS is initially located. The anchor PC of an idle mode MS may store the information about the said MS in idle mode. At different times in a network, different MSs in idle mode may have different anchor PCs. Each anchor PC may store information about one or more MSs in idle mode. When the MS moves from one PG to another, it may update the location with the anchor PC. When an idle mode MS moves away from its current PG and enters a new PG, its location information may be updated. This way, the idle MS may be tracked by the wireless network at the granularity of paging group, as opposed to a non-idle MS which may be tracked at the granularity of a BS. The network may use the approximate location information of an idle mode MS to locate and set up new connections with it.

Whenever required, the MS may be precisely tracked to its associated BS by sending a broadcast message known as Mobile Paging Advertisement (MOB-PAG-ADV) message to at least some BSs that comprise the MS's current PG. When the wireless network wants to locate an idle-mode MS, or has incoming data buffered for it, or for administrative purposes, the PC may initiate paging the MS. When a PC initiates paging for the MS the BSes of MS's PG in turn may broadcast MOB-PAG-ADV messages on the air-link. If the MOB-PAG-ADV is sent during the PLI of the MS, then the MS is expected to receive the page and perform network re-entry or location update in response to the page if it is alerted to do so.

Both air-link signaling messages (e.g., the respective MOB-PAG-ADV messages broadcasted by the BSes in the PG and messages exchanges between the MS and its serving BS during network re-entry) as well as backbone signaling messages (i.e., messages exchanged between various combinations of an MS, a BS, a PC, and various other network entities) may be used during a paging operation. The generation, transmission, reception and/or processing of air-link signaling messages and/or backbone signaling messages are examples of processes required to support paging groups which result in consumption of resources of the wireless network. Limited network resources may result in a limited ability to implement paging groups and/or may otherwise impact wireless network performance.

BRIEF DESCRIPTION OF THE DRAWINGS

The various embodiments of the present invention are illustrated by way of example, and not by way of limitation, in the figures of the accompanying drawings and in which.

DETAILED DESCRIPTION

Figure 1:
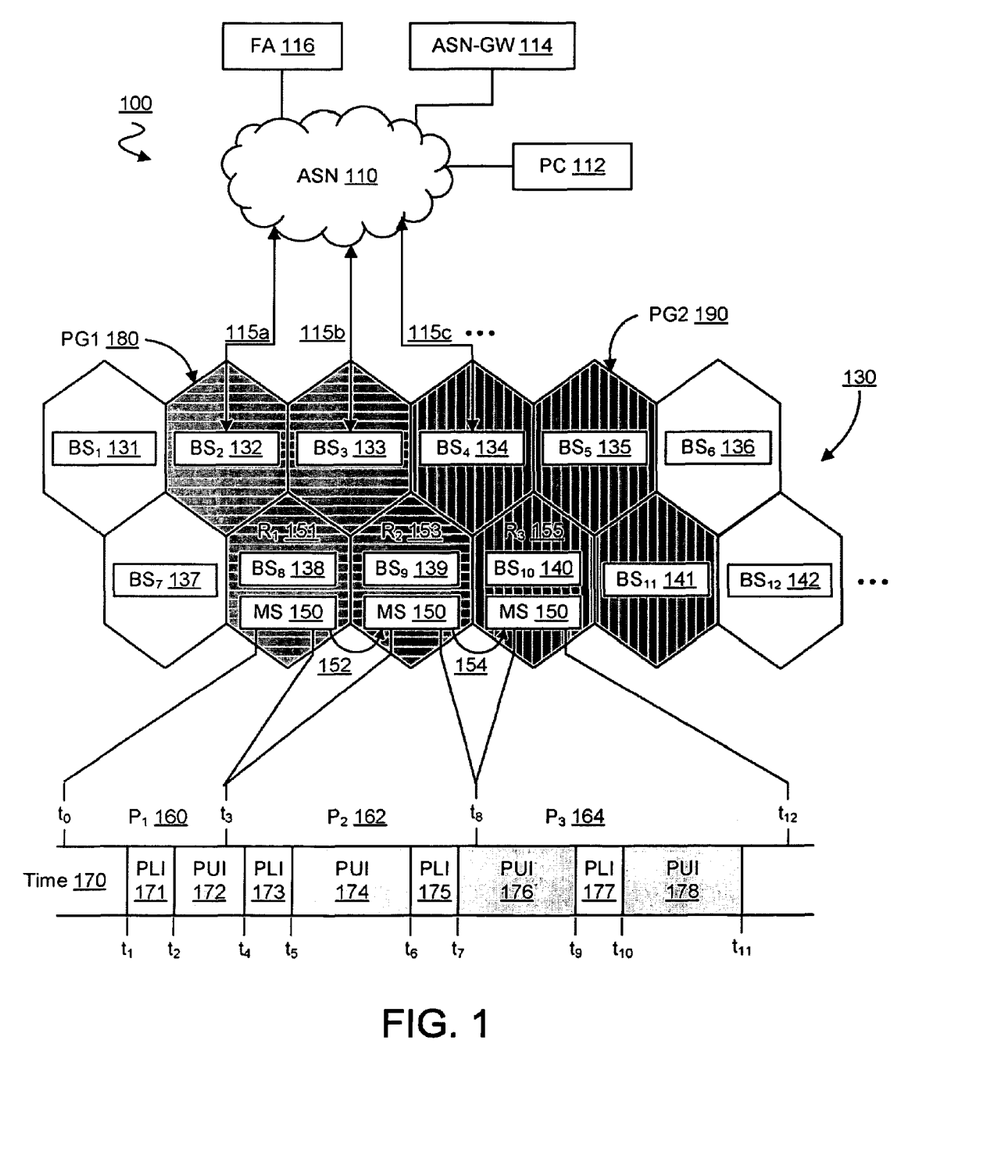
FIG. 1 is a block diagram illustrating a wireless communication network to implement current wireless communication techniques.

FIG. 1 illustrates a wireless communication network 100 according to existing wireless communication techniques. Wireless communication network 100 may support wireless communications compatible with a communications standard which supports PGs such as IEEE 802.16e-2005. Wireless communication network 100 may include a set of cells 130 having a plurality of base stations $BS_1$ 131, $BS_2$ 132, ..., $BS_{12}$ 142 each providing networking services to a respective geographic region. The number and arrangement of base stations $BS_1$ 131, $BS_2$ 132, ..., $BS_{12}$ 142 is illustrative, and may be substituted for any of a variety of alternative numbers and/or arrangements of BSs.

The BSs in the set of cells 130 may be in communication with an Access Service Network (ASN) 110, e.g. each via a respective connections 115a, 115b, 115c, ... etc. Accordingly, a MS 150 may thereby access networked services via a base station servicing a geographic area in which MS 150 operates. By way of non-limiting example, MS 150 may include any of a variety of cell phones, personal digital assistants, handheld computers or similar mobile devices capable of wireless communication with a network such as wireless communication network 100. For example, MS 150 may initially operate in a region $R_1$ 151 serviced by base station $BS_8$ 138. In the absence of an active call session, battery power of MS 150 may be conserved by implementing an idle mode and related paging procedures such as those defined in the IEEE 802.16e-2005 standard. As used herein, "idle mode" refers to a mode of operation wherein an MS relinquishes all of its connections and states associated with the base station (BS) it was last registered with. During this idle mode the MS de-registers from its serving BS and alternates between paging listening interval (PLI) and paging unavailable interval (PUI). During PUI one or more portions of a MS is shut down to save power. Using paging procedures, MS 150 may return to a non-idle ("active") mode whenever required—e.g. when there is an incoming call for the MS.

Region $R_1$ 151 may be in a geographic paging area of a paging group PG1 180, e.g. a PG including respective areas serviced by $BS_2$ 132, $BS_3$ 133, $BS_8$ 138 and $BS_9$ 139. A different paging group PG2 190 may include $BS_4$ 134, $BS_5$ 135, $BS_{10}$ 140 and $BS_{11}$ 141. The particular number, size and configuration of PGs in the set of cells 130, is merely illustrative, as are the number and configuration of one or more base stations of any given PG. Any of a variety of additional and/or alternative arrangements of BSs and PGs in a set of cells may be used.

While operating in idle mode, as represented by timeline 170, MS 150 may variously alternate between periods 171, 173, 175, 177 of listening for paging messages, known as "paging listen interval" (PLI), and periods 172, 174, 176, 178 during which MS 150 powers off its radio interface, known as "paging unavailable interval" (PUI). While operating in idle mode, MS 150 may be in region $R_1$ 151 during a period $P_1$ 160 defined by time $(t_3-t_1)$. MS 150 may be in region $R_2$ 153 during a period $P_2$ 162 defined by time $(t_8-t_3)$ after migration 152 from region $R_1$ 151. However, if time $t_3$ is during a PUI 172, MS 150 may only receive an indication that it is in region $R_2$ during a next PLI 173, defined by time $(t_5-t_4)$, after time $t_3$. Similarly, MS 150 may be in region $R_3$ 155 during a period $P_3$ 164 defined by time $(t_{12}-t_8)$ after migration 154 from region $R_2$ 153. However, if time $t_8$ is during PUI 172, MS 150 may only receive an indication that it is in region $R_3$ during a next PLI 177, defined by time $(t_{10}-t_9)$, after time $t_8$. Similarly, it may only be during PLI 177 that MS 150 receives an indication that it is no longer operating in paging area 180.

The current PG of MS 150 may be maintained by a PC 112, which maintains a location database (not shown) to keep information about idle MSs in the PG(s) managed by PC 112. Each BS in PG1 180 may broadcast a respective Mobile Paging Advertisement (MOB-PAG-ADV) message containing identifiers of idle mode MSs that are being paged at a particular time. In addition to the identification of the idle mode MSs that are being paged at a particular time, the MOB-PAG-ADV message also contains the PG identifications the BS transmitting this message belong to. For example, the MOB-PAG-ADV message transmitted by a BS in PG1 180 contains the PG 180 ID. When a BS belongs to more than one PG it includes the ID of all those PGs to which it belongs to in the MOB-PAG-ADV messages that it broadcasts. When an idle MS 150 receives a MOB-PAG-ADV message, it may use the message to learn a paging area (e.g. PG2 190) where it may be residing at the time of receiving the MOB-PAG-ADV message. Idle MS 150 may then store the information about the ID of the paging area where it is residing. When idle MS 150 learns that it has moved to a paging area that is different than the paging area stored in its database, said idle mode MS 150 may determine that it has moved to a new paging area. Then, said idle mode MS 150 may perform location update and may store the new paging area as its paging area of residence.

A location update may be carried out using any of a variety of protocols. By way of non-limiting example, MS 150 may send Ranging Request (RNG-REQ) message to the serving BS (SBS) in whose coverage area the MS 150 is currently residing, the RNG-REQ message indicating that it needs to perform location update. Upon receiving a RNG-REQ message, the BS currently serving MS 150 may send a location update request (LU_Req) message to ASN-GW 114. The LU_Req may contain information including, but not limited to, an MS identifier MSID, a PG identifier PGID, and a PC identifier PCID. The PGID and PCID may correspond to the new paging area. Upon receiving the LU_Req message, the ASN-GW 114 may in turn send the LU_Req message to the PC 112. The PC 112 may reply to the ASN-GW 114 by sending a location update response (LU_Rsp) message. Then, the AGW may forward the LU_Rsp to the SBS. Finally, when the SBS receives the LU_RSP, it may send a Ranging Response (RNG-RSP) to the MS informing about the successful completion of location update. Then, SBS may send a location update confirm (LU_Confirm) message to the AGW, which in turn may send the LU_Confirm message to the PC 112.

At some point, MS 150 may need to be paged, e.g. due to a gateway ASN-GW 114 of ASN 110 sending data for delivery to MS 150. For example, a foreign agent FA 116 of MS 150 may send to ASN-GW 114 downlink traffic for MS 150, e.g. on behalf of a home agent HA (not shown) of MS 150. Although the paging of MS 150 is discussed herein with respect to an FA 116, it is understood that any of a variety of additional and/or alternative agents (not shown) may variously act in place of some or all of the operations of FA 116. While MS 150 is in idle mode, FA 116 may contact the PC 112 of MS 150, e.g. by sending MS Paging Request (MS-PAG-Req) message to PC 112. Upon receiving MS-PAG-Req for MS 150, PC 112 may direct some or all BSes in the current PG of MS 150 (e.g. PG1 190) to send a respective MOB-PAG-ADV message containing paging information for MS 150 during MS 150's next PLI. PC 112 may have information about PLI periods of MS 150 to coordinate such MOB-PAG-ADV messages. MS 150 may receive the MOB-PAG-ADV message from a BS of PG2 190 and learn about the paging operation. Then, MS 150 may perform network re-entry operations to terminate it's idle mode and returns to connected mode.

Both air-link signaling messages (i.e., MOB-PAG-ADV message broadcast by the BSs in the paging area and messages exchanged between the MS and its SBS during network re-entry) as well as backbone signaling messages (i.e., messages exchanges between the MS's SBS, AGW/FA, PC, and HA) may be used during a paging operation.

Figure 2:
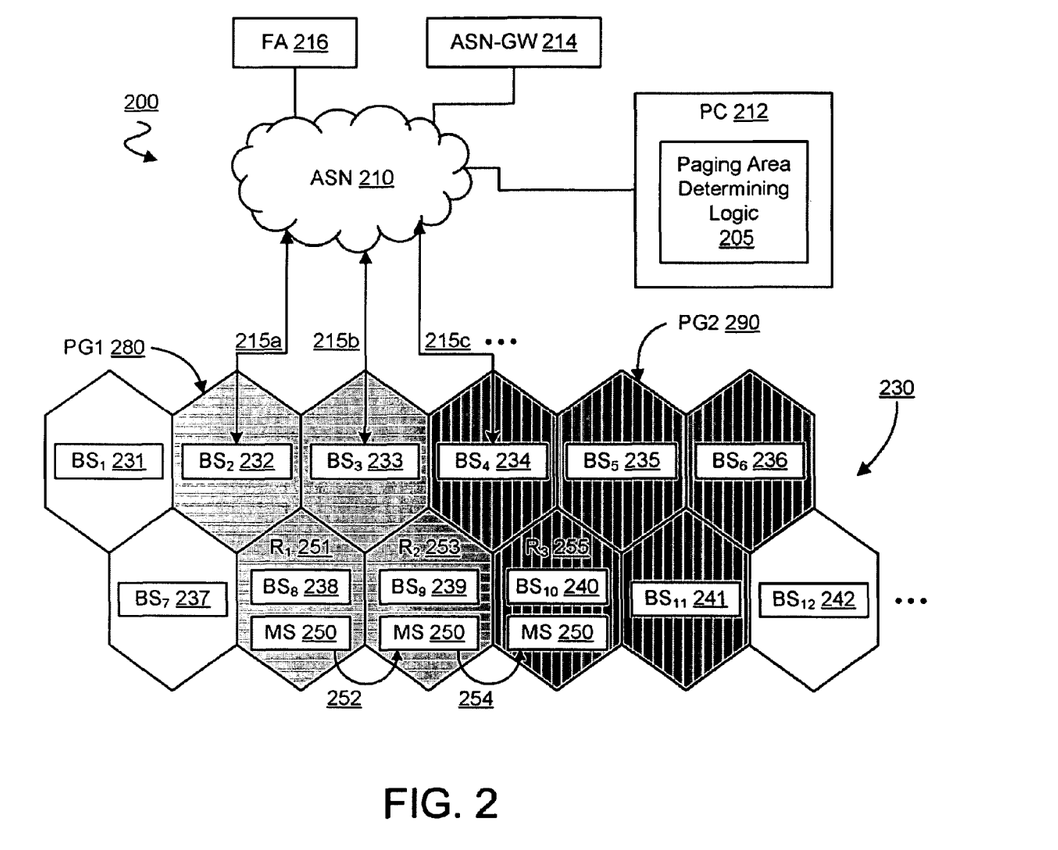
FIG. 2 is a block diagram illustrating select elements of a wireless communication network according to an embodiment.

FIG. 2 illustrates select elements of a wireless communication network 200 according to an embodiment of the invention. In certain embodiments, wireless communication network 200 may variously include at least some of the components and/or features described herein with respect to wireless communication network 100. Wireless communication network 200 may include a set of cells 230 having a plurality of base stations $BS_1$ 231, $BS_2$ 232, ..., $BS_{12}$ 242 each providing communication services to a respective geographic region. The number and arrangement of base stations $BS_1$ 231, $BS_2$ 232, ..., $BS_{12}$ 242 is illustrative, and may be substituted for any of a variety of alternative numbers and/or arrangements. The BSs in the set of cells 230 may be connected to an Access Service Network (ASN) 210, e.g. each via a respective connection 215a, 215b, 215c, ... etc. Accordingly, a MS 250 may thereby access networked services via a base station servicing a geographic area in which MS 250 operates. Communications of MS 250 may be variously supported via FA 216, ASN-GW 214 and/or PC 212, according to at least some of the respective related techniques described herein.

In an embodiment, MS 250 may operate in an idle mode as described herein, e.g. during a migration 252 from a region $R_1$ 251 serviced by base station $BS_8$ 238 to a region $R_2$ 253 serviced by $BS_9$ 239 and during a migration 254 from a region $R_2$ 253 services by base station $BS_9$ 239 to a region $R_3$ 255 serviced by $BS_{10}$ 240. Migration 254 may bring MS 250 from a PG1 280 to a PG2 290. In an embodiment, the respective paging areas of PG1 280 and PG2 290 may be different—e.g. the respective total number of BSs in PG1 280 and PG2 290 may differ. Furthermore, the size of a given paging area may be determined and/or changed based on changing characteristics of the network. By way of non-limiting example, a paging area of a given PG may, according to varying embodiments, be determined based on value of one or more dynamically changing communication characteristics. Wireless communication network 200 may include paging area determining means 205—e.g. any of a variety of combinations of hardware and/or software means to determine a size of a paging area based on the value of a dynamically changing communication characteristic. Although shown in FIG. 2 as residing in PC 212, it is understood that paging area determining means 205 may, in various embodiments, reside in one or more additional or alternative components of wireless communication network 200.

In various embodiments, a paging area may be determined based on a dynamically changing characteristic in order to reduce the use of communications resources in a wireless communication network during the idle mode operation of an MS. As discussed herein with respect to FIG. 1, both air-link signaling messages (i.e., messages exchanges between the MS and its SBS) as well as backbone signaling messages (i.e., messages variously exchanged between one or more of a MS's SBS, a ASN-GW, and PC) may be used for a location update. The amount of resources used for air-link signaling messages for a location update may be denoted by $U_a$. Similarly, the amount of resources used for backbone signaling messages for a location update may be denoted by $U_b$. Such resources may include, but are not limited to, data processing cycles, air-link channel frequency, air-link channel time, backbone medium (e.g., wireline) bandwidth, backbone medium (e.g., wireline) time, memory, buffer space, and/or any other such limited feature of a wireless network system—e.g. in a MS, one or more BSs, an ASN, etc.—which may be available and at least partially consumed in the course of sending, receiving and/or processing a communication signal exchanged in the wireless network. In general, air-link resources are costlier than backbone resources. To account for this fact, relative weights $w_a$ and $w_b$ may be given to the respective air-link and backbone resources. Thus, an effective amount of resources used for a single location update operation may be represented by:

$$\alpha = w_a U_a + w_b U_b \qquad (1)$$

The particular valuation of individual resources in determining their respective contributions to either of $U_a$ and $U_b$—and the particular valuation of weights $w_a$ and $w_b$—is dependent on the particular configuration of the wireless network in question, and is therefore implementation-specific. In an embodiment, $U_a$ and/or $U_b$ may depend on the protocols used for location update procedure making a dependent on the protocols used for location update. For example, $U_a$ may be calculated by adding the air-link resources used in the RNG-REQ and RNG-RSP messages exchanged between the MS and it's serving BS (SBS) during location update procedures. Similarly, $U_b$ may be calculated by adding the backbone resources used in the signaling messages exchanged between MS's SBS, AGW, and PC.

The amount of resources for air-link signaling messages per MS which are used by a single BS for a paging operation may be denoted by $M_a$. Similarly, the amount of resources for backbone signaling messages per MS which are used by a single BS for a paging operation may be denoted by $M_b$. As discussed earlier using $w_a$ and $w_b$ as the weights of air-link and backbone resources, the effective amount of resources used per MS during paging operation may be given by $$\beta = w_a M_a + w_b M_b \qquad (2)$$

$M_a$ and/or $M_b$, and thus $\beta$, may depend on a protocol used for paging operation. It may be noted that $w_a$ in Eq (1) and Eq (2) could be same or different. Similarly, $w_b$ in Eq (1) and Eq (2) could be same or different. For ease of illustration in the following discussion $w_a$ and $w_b$ in Eq (1) and Eq (2) are considered to be same. However, it may be noted that the following discussion and analysis can be easily extended/carried out for scenarios where $w_a$ and/or $w_b$ in Eq (1) and Eq (2) are different. For example, $M_a$ may be determined by calculating the air-link resources used per MS by a single BS in a MOB-PAG-ADV message. Similarly, $M_b$ may be calculated by adding the backbone resources used in the signaling messages exchanged between MS's SBS, AGW/FA, and PC.

An idle instance may be defined as the event from the time an MS enters into idle mode until the time it terminates its idle mode. Accordingly, an MOB-PAG-ADV message may be used for a particular idle mode MS just once, i.e., to terminate the idle instance of the said MS. However, the number of location updates (LUs) performed by the MS may depend on how many cell boundaries the MS crosses during the idle instance. Thus, the total air-link as well as backbone resources used by the MS during an idle instance may depend on the number of LUs performed by the MS during an idle instance. For example, the following parameters represent at least some of the dynamically changing characteristics which values may be used to determine a number of LUs performed by an MS during an idle instance.

Average speed of the idle mode MS=$E[v]$

Average duration of the idle instance of the idle mode MS=$E[T_s]$

Radius of a paging group (PG)=R

As used herein, a value of a dynamically changing characteristic may include one or more of a past, present, expected, actual, average and/or estimated value of said characteristic. Information representing a speed value of an MS may be generated using any of a variety of existing methods. For example, the MS itself may use existing techniques to determine (e.g. at the physical layer of the MS) a speed of the MS based on a Doppler spread in the envelope of a received signal—a technique known as velocity estimation using power spectral density (VEPSD). Alternatively or in addition, the MS and/or other components of the communications network could use the number of location updates performed during a particular period and use information about the cell size to determine an average speed of the MS. Alternatively or in addition, a speed value of an MS may be determined by the MS and/or by other network components using information from other systems, such as global positioning satellite (GPS) data. Depending on the particular network implemented and/or or the particular capabilities of a given MS, the MS and/or another network component may inform the Paging Area Determining Means about the speed of the MS.

The average duration of the idle instance may depend on the time between two consecutive received sessions. For example, the time between two consecutive voice calls received by an MS. This could depend on the characteristic of the user using the MS. For example, a user of an MS on the move may be receiving calls frequently. In this case, the duration between two consecutive received sessions by the MS is small, making the average duration of idle instance short. On the other hand, the MS of a user that rarely receives a call may have longer average idle instance. The MS or network may learn about the average idle instance of an MS using the received call pattern of the user using the MS. Then the MS or the network may inform the Paging Area Determining Means about the average idle instance of an MS.

PG residency time may be defined as the average time duration during which an MS resides in a particular PG. PG residency time of an MS may depend on its average speed and the PG radius. Moreover, the PG residency time of an MS in a particular PG may depend on the trajectory of MS during its stay in the said PG. The average value of PG residency time may be denoted by $E[T_c]$. For purposes of illustration, features of various embodiments are described using the PG residency time formulation given by eq. (3). It may be noted that other formulations of PG residency time may be used. In an embodiment, an average PG residency time, $E[T_c]$, may be given by $$E[T_c] = \frac{\pi R}{2E[v]} \qquad (3)$$

Thus, on average the MS in idle mode may reside in one PG for $E[T_c]$ time. Therefore, an estimate of the number of LUs performed by the idle mode MS during a single idle instance may be based on an estimate of the number of times the MS moves from one PG to another. For example, based on an average time $E[T_s]$ of an idle instance of an MS, and the average time $E[T_c]$ that the MS spends in a particular PG, the number of LUs may be determined by dividing $E[T_s]$ by $E[T_c]$. Thus, an estimated number of LUs $E[h]$ during a single idle instance of the MS may be given by $$E[h] = \frac{E[T_s]}{E[T_c]} \qquad (4)$$
$$= \frac{2E[T_s]E[v]}{\pi R}$$

Using equations (1), (2), and (4), a total amount of resources, L, used by an idle mode MS during a single idle instance to carry the signaling messages during LUs and paging operation may be given by $$L = E[h]\alpha + N\beta \qquad (5)$$
$$= \frac{2E[T_s]E[v](w_a U_a + w_b U_b)}{\pi R} + \frac{R^2(w_a M_a + w_b M_b)}{r^2}$$

where N is the number of cells of radius r in the paging area of radius R and may be given by $$N = \frac{\pi R^2}{\pi r^2} \qquad (6)$$
$$= \frac{R^2}{r^2}$$

It is apparent from eq. (5) that, for different idle MSs in a WiMAX network having different average speeds E[v], for example, the amount of resources used by different MSs may vary. Even assuming that all other parameters have same value for each idle mode MS, the amount of resources (used for LUs and paging operation) for an idle mode MS with higher average speed E[v] may be more than the amount of resources (used for LUs and paging operation) for an idle mode MS with lower average speed. However, in various embodiments, the total number of resources L may depend on any of a variety of combinations of dynamically changing variables including, but not limited to, those of eq. (5).

Wireless network performance may be improved by reducing L in Eq. (5). By way of non-limiting example, the radius of the PG for a particular idle mode MS may be determined based on an average speed of the idle mode MS in such a way that the amount of resources, L, used by an idle mode MS during a single idle instance may be reduced. The PG that achieves reduced L is hereafter referred to as low-resource PG. The radius of low-resource PG may be determined by finding the value of R—hereafter referred to as Rmin—that reduces the L in Eq. (5), e.g. as described below.

In an embodiment, the value of R where L attains a local minimum value may be determined by solving the following equation:

$$\frac{dL}{dR} = 0 \qquad (7)$$

A value of R that satisfies Eq. (7) may be given by $$R = \left[\frac{E[T_s]E[v](w_a U_a + w_b U_b)}{\pi(w_a M_a + w_b M_b)}\right]^{\frac{1}{3}} r^{\frac{2}{3}} \qquad (8)$$

A second derivative of L, i.e., $$\frac{d^2 L}{dR}$$

establishes that the R of eq. (8) is a local minima $R_{min}$, where L increases for other neighboring R values. Accordingly, eq. (8) shows that, in an embodiment, an idle MS with higher average speed may have a higher $R_{min}$ compared to an idle mode MS with lower average speed. It may be noted that in this illustration, $R_{min}$ is determined considering E[v] as the only dynamically changing variable. However, in one embodiment more than one dynamically changing variables could be used to determine $R_{min}$.

Thus, for a particular idle mode MS, the radius of a paging area for low-resource PG may be determined using eq. (8).

Once $R_{min}$ is determined for an idle mode MS, a number of BSs, N, in the said low-resource PG may be calculated using $$N = \text{round}\left(\frac{R_{min}^2}{r^2}\right) \quad (9)$$

Where round function determines the nearest integer. Alternatively or in addition, functions such as $$\text{floor}\left(\frac{R_{min}^2}{r^2}\right) \text{ or } \text{ceil}\left(\frac{R_{min}^2}{r^2}\right)$$

may be used to determine the number of cells in the minimum-resource PG for the said idle mode MS. In various embodiments, alternative and/or additional techniques for calculating a page area based on dynamically changing communication characteristics may be used, e.g. to determine the number of cells in a low-resource PG. The communication characteristic may include a characteristic of a communication in a wireless network and/or a characteristic of one or more devices (e.g. MS and/or BS) capable of communicating in said wireless network. In an embodiment, a communication characteristic may include a physical characteristic of the MS affecting communications, such as a speed of an idle mode MS through a geographic area of a wireless communication network. Other examples of dynamically changing communication characteristics which may be used to determine a paging area include, but are not limited to, one or more of parameters $E[v]$, $E[T_s]$, $U_a$, $U_b$, $M_a$, $M_b$, $w_a$ and/or $w_b$ discussed herein. A device in the wireless communication network suitably configured to generate respective data representing a changed value of a communication characteristic may communicate said data for use by the paging area determining means according to techniques described herein.

Figure 3:
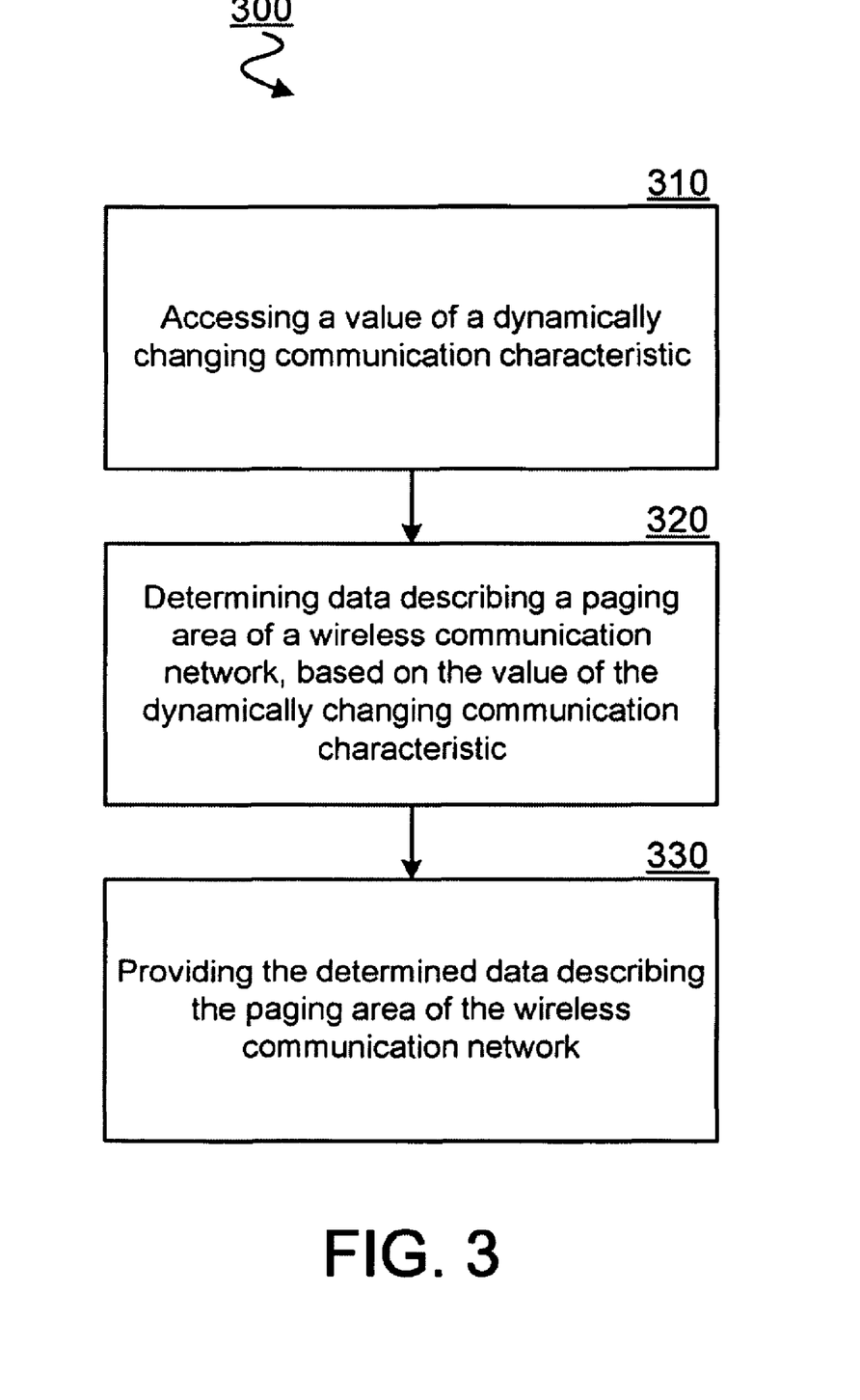
FIG. 3 is a flow diagram illustrating select elements of method of determining a paging area according to an embodiment.

FIG. 3 illustrates select elements of a method 300 for determining a paging area according to an embodiment. According to various embodiments, the method may be performed in wireless communication network 100. By way of non-limiting example, the method 300 may be performed by page area determining means 205. In various embodiments, method 300 may be performed by MS 250, by one or more of base stations $BS_1$ 231, $BS_2$ 232, . . . , $BS_{16}$ 248, and/or any data processing means of a component of ASN 210 (not shown) or PC (not shown) suitably configured to perform the determinations described herein. At 310, a value of one or more dynamically changing communication characteristic may be accessed. The characteristic may include any of a variety of attributes or capabilities related to a communication, actual or potential, including but not limited to one or more qualities, features, modes, etc. of the communication itself and/or of a communication channel, device and/or system supporting said communication. At 320, data describing a paging area of a wireless communication network may be determined based on the accessed value of the dynamically changing communication characteristic. At 330, the data describing the paging area may be provided as an output. Said out put may be used to determine or change the size of a paging area of a particular paging group.

Figure 4:
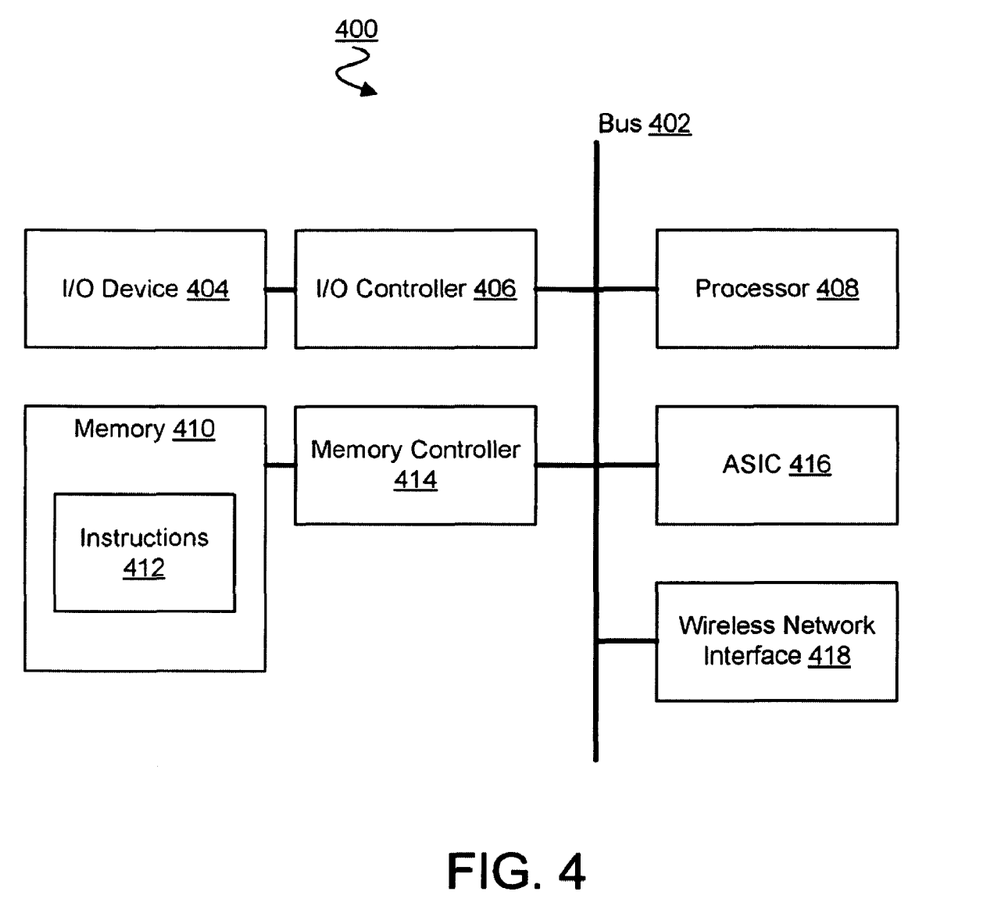
FIG. 4 is a block diagram illustrating select elements of an apparatus according to an embodiment.

FIG. 4 illustrates select elements of an apparatus 400 according to an embodiment. The apparatus 400 may include a mobile station such as MS 250 capable of communicating in a wireless communication network. In various alternate embodiments, apparatus 400 may include a base station such as one of base stations $BS_1$ 231, $BS_2$ 232, . . . , $BS_{16}$ 248. Alternatively, apparatus 400 may be some other device in a wireless communication network such as wireless network 100, e.g. a data processing component of ASN 100 (not shown) configured to determine various data according to techniques set forth herein. By way of non-limiting example, apparatus 400 may be configured to determine a paging area according to techniques such as those discussed herein with respect to FIG. 4.

In various embodiments, a bus 402 may interconnect various components of apparatus 400 to provide for data exchanges. Bus 402 may represent any of a variety of combinations of shared and/or dedicated buses, including but not limited to one or more data buses, control buses and/or input/output (I/O) buses. An I/O device 404 of apparatus 400 may be coupled to bus 402, e.g. via an I/O controller 406, to exchange information related to the determining of a paging area. By way of non-limiting example, I/O device 404 may include, for example, one or more of a keyboard, video screen, touch screen, mouse, mouse pad, speaker or similar device to exchange information with a user. Alternatively or in addition, I/O device 404 may include any of a variety of wired devices such as a modem to exchange such information with another device, e.g. via a wired connection.

A memory 410 of apparatus 400 may be coupled to bus 402, e.g. via a memory controller 414, to store data exchanged on bus 402. Memory 410 may, for example, include any of a variety of combinations of a read-only memory (ROM), a random access memory (RAM), a cache memory, a disk drive or any similar data storing means. By way of non-limiting example, memory 410 may store data describing a value of a dynamically changing communication characteristic and/or data describing a paging area of a wireless communication network Apparatus 400 may further include a processor 408 including one or more data processing units to perform various data processing techniques as described herein, e.g. the method 300 to determine data describing a paging area of a wireless communication network. In an embodiment, processor 408 may perform said data processing techniques in response to an execution of one or more computer-readable instructions—e.g. instructions 412 stored in memory 410. Alternatively or in addition, apparatus 400 may include an application specific integrated circuit (ASIC) 416 to provide a hardware implementation of one or more data processing techniques discussed herein. Although an ASIC 416 is shown, it is understood that any of a variety of additional and/or alternative hardware components, including but not limited to a programmable ROM (PROM) an erasable PROM (EPROM) or similar device may operate as means to variously perform one or more of the data processing techniques set forth herein.

The instructions 412 may include data structures embodying or utilized by any one or more of the methodologies or functions described herein. The instructions 412 may reside, completely or at least partially, within the main memory 410 and/or within the processor 408 during execution thereof by the apparatus 400, e.g. where the processor 402 also includes machine-readable media.

While the memory 410 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention, or that is capable of storing, encoding or carrying data structures utilized by or associated with such a set of instructions. The term "machine-readable medium" shall accordingly be taken to include, but not be limited to, solid-state memories, optical and magnetic media.

Figure 5:
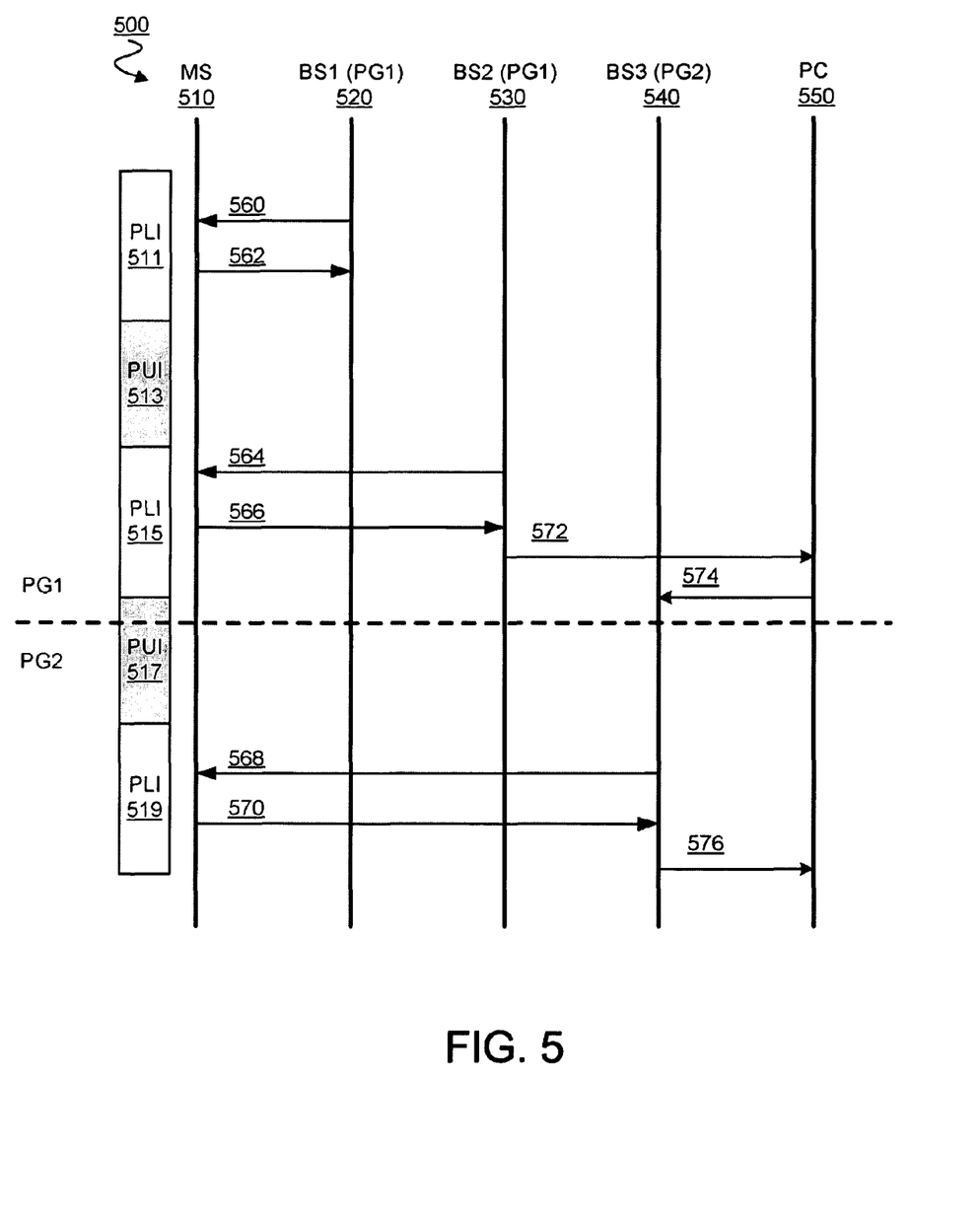
FIG. 5 is a swim lane diagram illustrating select elements of communications in a wireless communication network according to an embodiment.

FIG. 5 illustrates select elements of an exchange 500 of messages within a wireless network system according to an embodiment. The message exchange 500 may occur within wireless communication network 100, for example. In an exemplary embodiment, the wireless communication network may include base stations BS1 520, BS2 530 and BS3 540. The base stations may service respective geographic areas and provide access to a PC 550. More particularly, base stations BS1 520 and BS2 530 may service respective regions of a paging area of paging group PG1, while base station BS3 540 may service a region of a paging area of paging group PG2.

According to an embodiment, an MS 510 may initially be operating in an idle mode while in the paging area of PG1, e.g. in a region serviced by BS1 520. While operating in idle mode, MS 510 may alternate between PLI periods 511, 515, 519 and PUI periods 513, 517. At the time of PLI period 511, MS 510 may be located in a region serviced by BS1 520, with which messages 560, 562 may be exchanged. Similarly, at the time of PLI period 515, MS 510 may be located in a region serviced by BS2 530, with which messages 564, 566 may be exchanged. For example, messages 560 and 562 may variously include respective MOB-PAG-ADV messages, e.g. which indicate that MS 510 has not left PG1 and/or which indicate that MS 510 is not being paged. Accordingly, MS 510 may variously forego reconnecting to either of BS 1 and BS2, although either or both of messages 562, 566 may indicate—individually or in combination—a dynamically changing characteristic from which a new paging area of PG2 may be determined, according to techniques described herein.

At the time of PLI period 519, MS 510 may be located in a region of PG2 serviced by BS3 540, whereupon MS 150 may determine—e.g. via a MOB-PAG-ADV message 568—that MS 510 is no longer located in PG1. At this point, MS 510 may initiate a location update process to acknowledge the move from PG1 to PG2. This location update may be indicated at least in part by the message 570 from MS 510 to BS3 540. BS3 540 provides an indication 576 to PC 550 that a location update for MS 510 is taking place. In various embodiments, information describing the new paging area for MS 510 may be provided to MS 510 using MOB-PAG-ADV message 568.

In the illustrative example of FIG. 5, PC 550 may access a value of a dynamically changing communication characteristic, e.g. related to communications of MS 510. For example, a BS such as BS2 530 may send an indication 572 of a speed of MS 510. Based on the value of a dynamically changing communication characteristic, PC 550 may determine a paging area of the wireless network, and provide an indication 574 of the determined paging area to BS3 540—e.g. indicating that BS3 540 is in the determined PG2. In turn, BS3 540 may assign paging group PG2 to MS 510 or otherwise communicate an indication of the determined paging area of PG2.

The size of a paging area for a particular MS in idle mode may be based on characteristics such as a speed of the MS, an average duration of idle mode operation (this is typically the duration between the time when the MS enters the idle mode and the time when it exit the idle mode), a signaling overhead required for the operations involved when an idle mode MS moves from one paging area to another, and/or a signaling overhead required for the operations involved when an idle mode MS needs to be notified of its traffic arrival at the network.

Techniques and architectures for wireless communication are described herein. In the above description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the description.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed descriptions herein are presented in terms of algorithms and symbolic representations of operations on data bits within a computer memory. These algorithmic descriptions and representations are the means used by those skilled in the computing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs) such as dynamic RAM (DRAM), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

Besides what is described herein, various modifications may be made to the disclosed embodiments and implementations of the invention without departing from their scope. Therefore, the illustrations and examples herein should be construed in an illustrative, and not a restrictive sense. The scope of the invention should be measured solely by reference to the claims that follow.

What is claimed is:

1. A method comprising:
   accessing a value of a physical characteristic of a mobile station including a speed of the mobile station in a wireless communication network;
   determining data describing a paging area of the wireless communication network, the determining including identifying, based on the accessed value for the physical characteristic, information which is based on a derivative of a function with respect to a paging area radius, the function representing an estimate of resources consumed in a single idle instance, wherein the estimate of resources consumed varies with the physical characteristic; and
   transmitting in the wireless communication network the determined data describing the paging area.

2. The method of claim 1, wherein identifying the information which is based on the derivative of the function includes determining a local minima of the function for a range of paging area radius values.

3. The method of claim 1, wherein the resources consumed in the single idle instance include at least one of resources consumed for communications associated with the mobile station performing a location update, and resources consumed for communications associated with a paging group performing a paging operation.

4. The method of claim 1, wherein the physical characteristic includes a total time spent in a paging area by the mobile station.

5. The method of claim 1, wherein the accessed value of the physical characteristic is an estimated value.

6. The method of claim 1, wherein determining data describing the paging area includes determining a number of base stations to be included in a paging group.

7. The method of claim 6, wherein determining the number of base stations to be included in the paging group includes determining based on at least one of a rounded value of a ratio of the determined paging area to the area of an individual cell, a floor value of the ratio of the determined paging area to the area of the individual cell, and a ceiling value of the ratio of the determined paging area to the area of the individual cell.

8. The method of claim 6, wherein transmitting the determined data describing the paging area includes transmitting an indication that the mobile station is assigned to the paging group.

9. An apparatus comprising:
   a network interface to receive from a wireless communication network an indication of a value of a physical characteristic of a mobile station in the wireless communication network;
   a paging area determining means coupled to the network interface for determining a paging area to be assigned to the mobile station, the paging area determining means including means for identifying, based on the indicated value of the physical characteristic station, information which is based on a derivative of a function with respect to a paging area radius, the function representing an estimate of resources consumed in a single idle instance, wherein the estimate of resources consumed varies with the physical characteristic; and
   a memory coupled to the paging area determining means to store data indicating the determined paging area.

10. The apparatus of claim 9, wherein the physical characteristic includes a speed of the mobile station.

11. The apparatus of claim 9, wherein the means for identifying information which is based on the derivative of the function includes means for determining a local minima of the function for a range of paging area radius values.

12. The apparatus of claim 9, wherein the resources consumed in the single idle instance include at least one of resources consumed for communications associated with the mobile station performing a location update, and resources consumed for communications associated with a paging group performing a paging operation.

13. The apparatus of claim 9, the network interface further to transmit to the wireless communication network an indication of the determined paging area.

14. A method comprising:
   moving through a geographic area of a wireless communication network;
   transmitting to a paging controller of the wireless communication network data describing a speed associated with the moving through the wireless communication network, wherein a paging group is determined in response to the transmitting the data describing the speed, the determining the paging group including identifying, based on the data describing the speed, information which is based on a derivative of a function with respect to a paging area radius, the function representing an estimate of resources used in a single idle instance, wherein the estimate of resources used varies with a speed of movement through the wireless communication network; and
   receiving from the paging controller an indication that the paging group has been assigned.

15. The method of claim 14, further comprising:
   in response to receiving the indication that the paging group has been assigned, operating in an idle mode of communication according to the assigned paging group.

* * * * *